United States Patent
Sakayanagi et al.

(10) Patent No.: US 9,645,667 B2
(45) Date of Patent: May 9, 2017

(54) TOUCH SWITCH MODULE WHICH PERFORMS MULTIPLE FUNCTIONS BASED ON A TOUCH TIME

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

(72) Inventors: Noriyuki Sakayanagi, Kariya (JP); Makoto Arimoto, Toyota (JP); Koichi Masamura, Toyota (JP)

(73) Assignees: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/488,372

(22) Filed: Sep. 17, 2014

(65) Prior Publication Data
US 2015/0084896 A1   Mar. 26, 2015

(30) Foreign Application Priority Data
Sep. 21, 2013   (JP) ................................ 2013-196262

(51) Int. Cl.
G06F 3/041   (2006.01)
G06F 3/044   (2006.01)

(52) U.S. Cl.
CPC ............ G06F 3/0416 (2013.01); G06F 3/044 (2013.01); G06F 3/0418 (2013.01)

(58) Field of Classification Search
CPC ....................................................... G06F 3/041
USPC ........................................................ 345/173
See application file for complete search history.

(56) References Cited

U.S. PATENT DOCUMENTS

| | | | | |
|---|---|---|---|---|
| 2010/0052769 A1* | 3/2010 | Yamaguchi | ......... | G06F 3/03547 327/517 |
| 2011/0138284 A1* | 6/2011 | Wigdor | ................. | G06F 3/0488 715/727 |
| 2011/0248948 A1* | 10/2011 | Griffin | .................... | G06F 3/041 345/174 |

(Continued)

FOREIGN PATENT DOCUMENTS

| JP | H08152970 A | 6/1996 |
|---|---|---|
| JP | 2007109082 A | 4/2007 |

(Continued)

*Primary Examiner* — Jonathan Blancha
(74) *Attorney, Agent, or Firm* — Sughrue Mion, PLLC

(57) ABSTRACT

A touch switch module according to one embodiment comprises a panel, a touch sensor and a control unit. The control unit includes a touch time detecting unit, a comparing unit, an output unit and an output forbidding unit. The touch time detecting unit detects touch time for which a touch is performed. The comparing unit compares the touch time with a predetermined threshold. The output unit outputs an operation signal when the touch time is the threshold or more. The output forbidding unit forbids output of the operation signal when the touch time is less than the threshold. The touch includes successive touches performed in succession in a short time period, and a single touch performed at one time. The threshold includes a successive touch threshold and a single touch threshold. The successive touch threshold and the single touch threshold are different from each other.

4 Claims, 5 Drawing Sheets

(56) References Cited

U.S. PATENT DOCUMENTS

| | | | | |
|---|---|---|---|---|
| 2012/0159387 A1* | 6/2012 | Oh | ............... | G06F 3/04817 |
| | | | | 715/808 |
| 2013/0063366 A1* | 3/2013 | Paul | ............... | G06F 3/0416 |
| | | | | 345/173 |
| 2013/0100035 A1* | 4/2013 | Papakipos | ............... | G06F 1/169 |
| | | | | 345/173 |
| 2013/0162531 A1* | 6/2013 | Lin | ............... | G09G 5/08 |
| | | | | 345/157 |
| 2013/0181941 A1* | 7/2013 | Okuno | ............... | G06F 3/041 |
| | | | | 345/174 |
| 2013/0328804 A1* | 12/2013 | Oshima | ............... | G06F 3/04842 |
| | | | | 345/173 |

FOREIGN PATENT DOCUMENTS

| | | | |
|---|---|---|---|
| JP | 2007267388 | A | 10/2007 |
| JP | 2010056981 | A | 3/2010 |
| JP | 2012506590 | A | 3/2012 |
| JP | 2012-118903 | A | 6/2012 |
| JP | 2012256147 | A | 12/2012 |
| WO | 2013008330 | A1 | 1/2013 |

\* cited by examiner

TOUCH SWITCH MODULE WHICH PERFORMS MULTIPLE FUNCTIONS BASED ON A TOUCH TIME

BACKGROUND OF THE INVENTION

Field of the Invention

One aspect of the present invention relates to a touch switch module.

Related Background Art

Patent Literature 1 discloses a conventional touch switch module. The touch switch module has a panel, a touch sensor and a control unit. The panel displays image information for instructing an operation of an electrical equipment. A touch sensor is an electrostatic capacitance sensor formed in the panel. The touch sensor detects a touch of a user's finger based on a voltage value generated upon the touch on the image information. The control unit is connected to the touch sensor. The control unit outputs an operation signal for operating the electrical equipment based on this touch. The control unit has a predetermined threshold for detecting a touch.

In this touch switch module, the control unit determines a touch on image information when the voltage value generated by the touch is a threshold or more. Further, the control unit outputs the operation signal to the electrical equipment.

Patent Literature 1: JP 2012-118903 A

SUMMARY OF THE INVENTION

However, the conventional touch switch module determines every touch on a panel as a touch on image information when a voltage value is a predetermined threshold or more, and outputs an operation signal to the electrical equipment. Therefore, there is a concern that a user's unintentional touch causes the electrical equipment to malfunction.

One aspect of the present invention has been made in light of the situations of the conventional touch sensor, and an object of one aspect of the present invention is to prevent the electrical equipment from malfunctioning due to an unintentional touch.

A touch switch module according to one aspect of the present invention comprises: a panel which displays image information for instructing an operation of an electrical equipment; a touch sensor which is formed in the panel, and which detects a touch on the image information; and a control unit which is connected to the touch sensor, and which outputs an operation signal for operating the electrical equipment based on the touch, and the control unit includes a touch time detecting unit which detects touch time for which the touch is performed, a comparing unit which compares the touch time with a predetermined threshold, an output unit which outputs the operation signal when the touch time is the threshold or more, and an output forbidding unit which forbids an output of the operation signal when the touch time is less than the threshold, the touch includes successive touches performed in succession in a short time period, and a single touch performed at one time, the image information includes successive touch image information on which the successive touches are performed, and single touch image information on which the single touch is performed, the threshold includes a successive touch threshold to be compared with the touch time of the successive touch image information, and a single touch threshold to be compared with the touch time of the single touch image information, and the successive touch threshold and the single touch threshold are different from each other (claim 1).

In the touch switch module according to one aspect of the present invention, the touch time detecting unit of the control unit detects a touch time in which image information is touched. Further, the comparing unit of the control unit compares the touch time and the predetermined threshold. Further, the output unit of the control unit outputs the operation signal when the touch time is the threshold or more. However, the output forbidding unit of the control unit forbids the output of the operation signal when the touch time is less than the threshold. Consequently, when the user unintentionally touches the panel, by setting in advance a threshold corresponding to such a time, an operation signal for operating the electrical equipment is not outputted from the control unit by the touch and the electrical equipment does not malfunction.

In this case, it is possible to distinguish image information based on, for example, a frequency of a user's touch and distinguish an erroneous touch on the image information. Consequently, the user can more suitably operate the electrical equipment.

Consequently, the touch switch module according to one aspect of the present invention can prevent the electrical equipment from malfunctioning due to an unintentional touch.

With the touch switch module according to another aspect of the present invention, various devices such as an air-conditioning device, an audio device, a navigation system, illumination equipment, a mobile phone and the like may be adopted as the electrical equipments. For example, the electrical equipment may be an electrical equipment for a vehicle.

The touch sensor may be an electrostatic capacitance type sensor, and, in addition, may be a mechanical button, a surface acoustic wave sensor, an infrared sensor, a resistive sensor or the like. Further, according to another aspect of the present invention, the touch is not limited to a touch on image information, and also includes nearly touch to the image information so that signals can be generated. The image information is, for example, an icon displayed on, for example, an electrostatic capacitance panel.

As to the threshold, the successive touch threshold may be larger than the single touch threshold (claim 2). In this case, it is possible to match the threshold to the touch time, and the user can more easily perform an operation.

The touch may include the successive touches, the single touch and a long touch performed at one time in a long time. The image information may include the successive touch image information, the single touch image information and, long touch image information on which the long touch is performed. The threshold may include the successive touch threshold, the single touch threshold and a long touch threshold to be compared with the touch time of the long touch image information. The successive touch threshold, the single touch threshold and the long touch threshold may be different from one another. The successive touch threshold, the single touch threshold and the long touch threshold can be changed (claim 3).

In this case, it is possible to distinguish image information based on, for example, a frequency of a user's touch and distinguish an erroneous touch on the image information. Consequently, the user can more suitably operate the electrical equipment.

Further, in this case, in this touch switch module, the successive touch threshold, the single touch threshold and the long touch threshold can be changed, and can be customized by a user's intention. Consequently, the user can more easily operate the electrical equipment.

The threshold may have a relationship of the successive touch threshold<the single touch threshold<the long touch threshold (claim 4). In this case, the thresholds are higher in order of the successive touch threshold, the single touch threshold and the long touch threshold, so that it is possible to match the threshold to the touch time and the user can more easily perform an operation.

The electrical equipment may be an air-conditioning device for a vehicle (claim 5). In this case, the user can suitably adjust a temperature in a vehicle interior during driving.

The touch switch module according to one aspect of the present invention can prevent an electrical equipment from malfunctioning due to an intentional touch.

DESCRIPTION OF THE PREFERRED EMBODIMENTS

A specific embodiment of a touch switch module of the present invention will be described with reference to the drawings.

Figure 1:
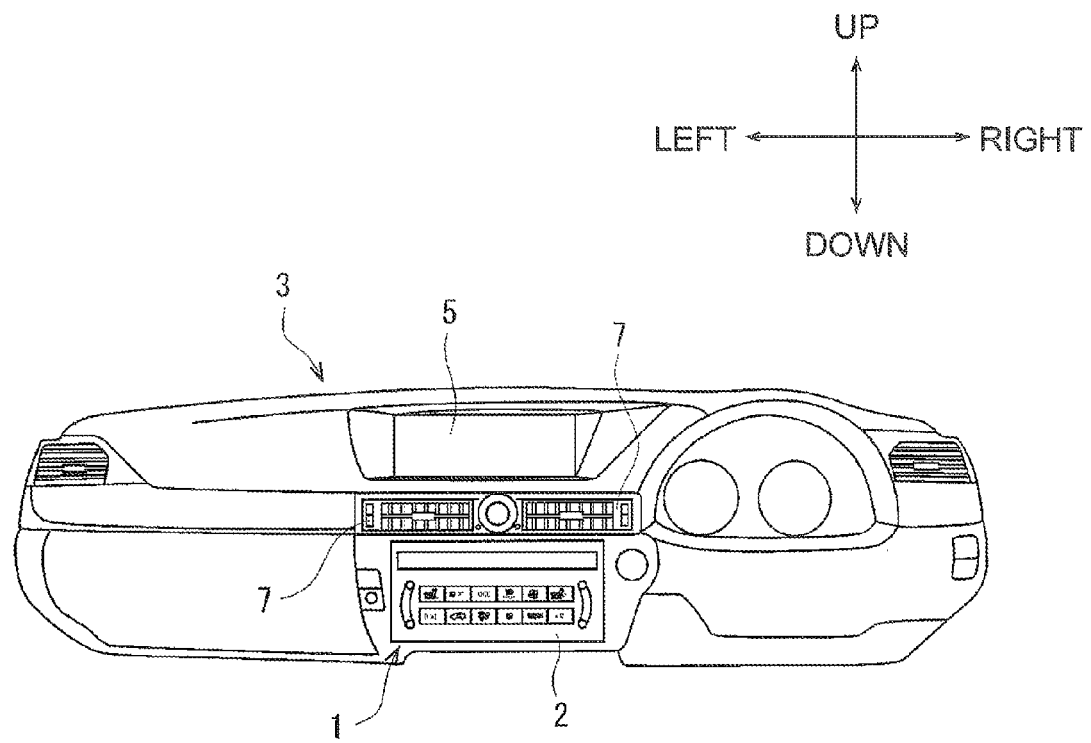
FIG. 1 is a front view of an instrument panel which uses a touch switch module according to an embodiment.
Figure 3:
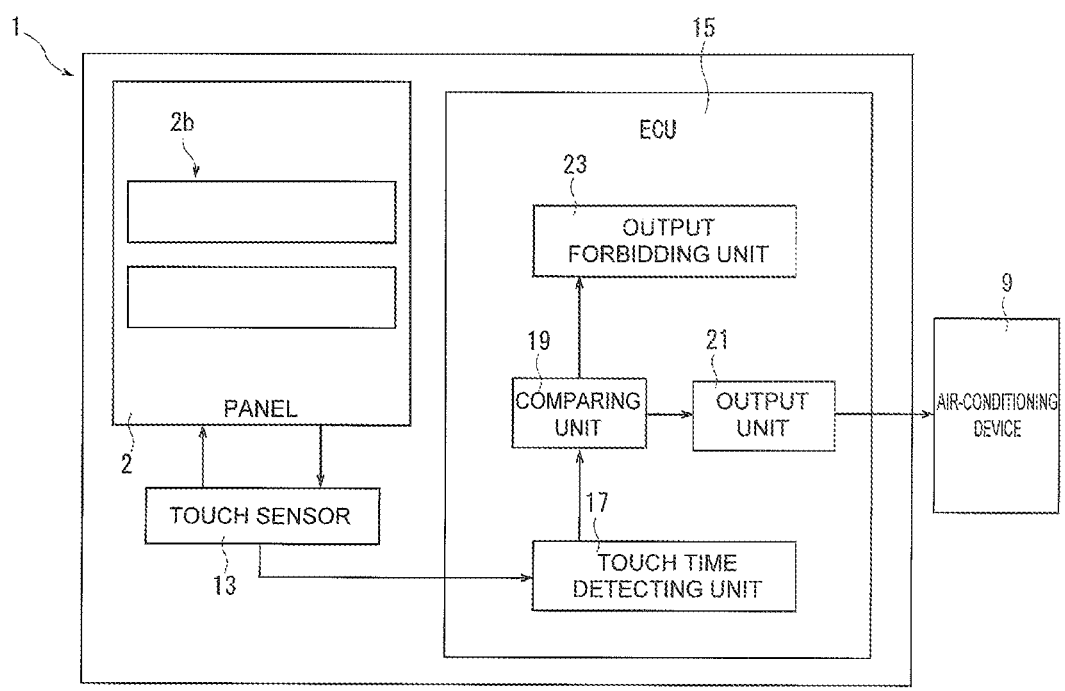
FIG. 3 is a block diagram illustrating the touch switch module according to the embodiment.

As illustrated in FIGS. 1 and 3, an electrical equipment according to the embodiment is an air-conditioning device 9 for a vehicle, and a touch switch module 1 controls this air-conditioning device 9. As illustrated in FIG. 1, the touch switch module 1 is mounted below a center portion of an instrument panel 3 which extends sideways in a vehicle interior. The instrument panel 3 has a car navigation system 5 and a center register 7 in addition to the touch switch module 1.

Figure 2:
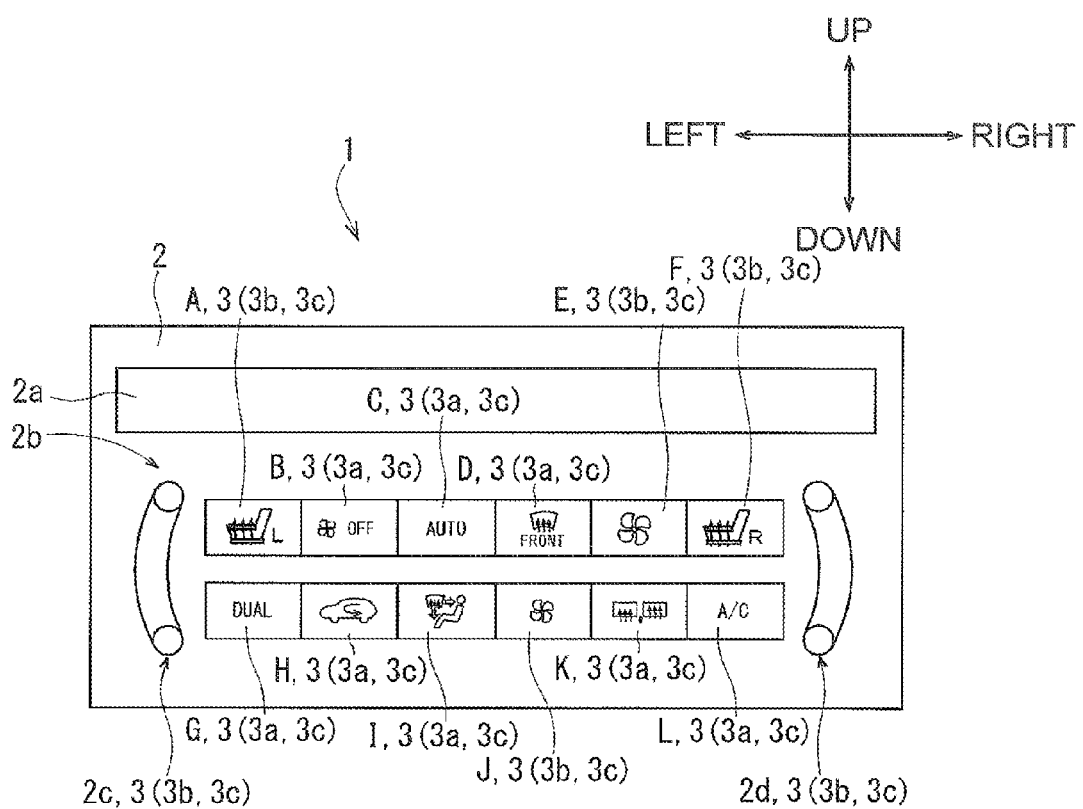
FIG. 2 is a front view of a panel of the touch switch module according to the embodiment.

The touch switch module 1 has a panel 2 as illustrated in FIG. 3. On the panel 2, a display unit 2a is provided as illustrated in FIG. 2, and twelve touch pads 2b and left and right slide bars 2c and 2d are displayed.

The display unit 2a is positioned in an upper portion of the panel 2, and extends in a vehicle width direction. The display unit 2a displays various items representing a setting state and a current state of the air-conditioning device 9.

Each of the touch pads 2b corresponds to image information 3 which a user pushes with a finger to operate the air-conditioning device 9. The touch pads 2b correspond to various items displayed on the display unit 2a. The touch pads 2b are provided in two rows in a lower portion of the panel 2. The touch pads 2b in the upper row include a switch A, a switch B, a switch C, a switch D, a switch E and a switch F provided from a left side to a right side. The touch pads 2b in the lower row include a switch G, a switch H, a switch I, a switch J, a switch K and a switch L provided from a left side to a right side.

The switch A can be used to switch on or off a seat heater of a left seat (not shown). The switch B can be used to stop the air-conditioning device 9. The switch C can be used to set the air-conditioning device 9 to an auto mode. The switch D can be used to prevent fogging of a front glass (not shown). The switch E can be used to increase the amount of air from the air-conditioning device 9. The switch F can be used to switch on or off a seat heater of a right seat (not shown). The switch G can be used to separately set a temperature of the air blown to a driver's seat (not shown), and a temperature of the air blown to a passenger's seat (not shown). The switch H can be used to allow the air to circulate within a vehicle interior. The switch I can be used to prevent fogging of the front glass, and to blow the air to lower bodies and upper bodies of those sitting at the driver's seat and the passenger's seat, respectively. The switch J can be used to decrease the amount of the air from the air-conditioning device 9. The switch K can prevent fogging of a rear glass (not shown). The switch L can be used to activate or stop dehumidification or cooling by the air-conditioning device 9.

The slide bars 2c and 2d also correspond to the image information 3. As illustrated in FIGS. 2 and 3, the slide bars 2c and 2d are positioned on the left and the right of the touch pads 2b to allow the passenger sitting at the passenger's seat in addition to the driver of the vehicle as users to perform an operation with their fingers. The slide bars 2c and 2d can be used to increase or decrease the temperature of the air blown from the air-conditioning device 9 into the vehicle interior.

The slide bars 2c and 2d, the switch A, the switch E, the switch F and the switch J are successive touch image information 3b which can be touched in succession. The slide bars 2c and 2d, the switch A, the switch E, the switch F and the switch J are successively touched very often by the user to adjust environment in the vehicle interior, which is why the slide bars 2c and 2d, the switch A, the switch E, the switch F and the switch J are regarded as the successive touch image information 3b.

Further, the switches B to D, the switches G to I, the switch K and the switch L are single touch image information 3a on which a single touch can be performed. The switches B to D, the switches G to I, the switch K and the switch L are only touched once by the user to perform an ON or OFF operation, and not touched so often, which is why the switches B to D, the switches G to I, the switch K and the switch L are regarded as the single touch image information 3a. In addition, the slide bars 2c and 2d and the switches A to L become long touch image information 3c on which a long touch can be performed when the user touches two or more of these for a long time.

In this regard, touch includes the successive touches, the single touch and the long touch. The successive touches are performed in succession in a short time period. The single touch is performed at one time. The long touch is performed at one time for a long time.

As illustrated in FIG. 3, the touch switch module 1 has the above panel 2 and, in addition, a touch sensor 13 and an ECU 15 as a control unit.

The touch sensor 13 is provided in a back surface of each image information 3 of the panel 2. The touch sensor 13 detects a touch on the panel 2. The touch sensor 13 adopts an electrostatic capacitance type.

Figure 4:
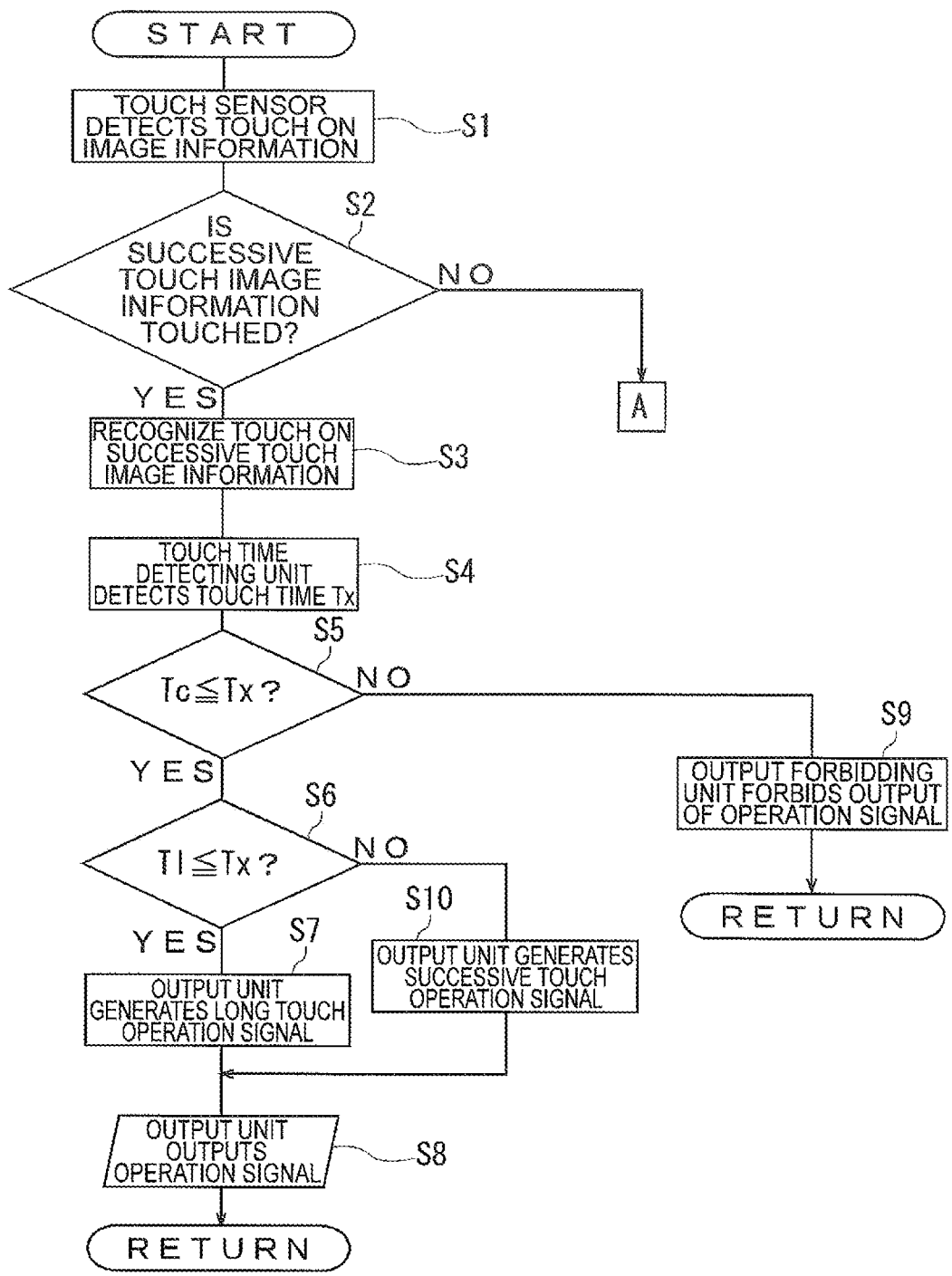
FIG. 4 is a flowchart illustrating that the panel of the touch switch module according to the embodiment is operated.

The ECU 15 is connected with the touch sensor 13. In the ECU 15, a program and the like for executing the flowchart illustrated in FIG. 4 are stored. As illustrated in FIG. 3, the ECU 15 has a touch time detecting unit 17, a comparing unit 19, an output unit 21 and an output forbidding unit 23.

The touch time detecting unit 17 detects touch time Tx for which a touch is performed. The comparing unit 19 compares the touch time Tx with a predetermined threshold. The comparing unit 19 stores a successive touch threshold Tc, a single touch threshold Ts and a long touch threshold T1 which are different from one another. The time of each threshold is long in order of the successive touch threshold Tc, the single touch threshold Ts and the long touch threshold T1.

The user in the vehicle interior operates the panel 2 while looking at various items displayed on the display unit 2a according to the temperature in the vehicle interior, and operates the air-conditioning device 9. When the user operates the panel 2, the ECU 15 starts the flowchart illustrated in FIG. 4.

When the user operates the switches A to L or the slide bar 2c or 2d, the touch sensor 13 detects a touch on the image information 3 in step S1.

In subsequent step S2, whether or not the successive touch image information 3b is touched is determined. When the slide bar 2c or 2d, the switch A, the switch E, the switch F and the switch J which are the successive touch image information 3b are touched, a determination result is YES and the process moves to step S3. In step S3, the touch sensor 13 recognizes that the successive touch image information 3b is touched.

In subsequent step S4, the touch time detecting unit 17 detects the touch time Tx for which the panel 2 is touched.

In subsequent step S5, the comparing unit 19 compares the touch time Tx with the successive touch threshold Tc. When the touch time Tx is less than the successive touch threshold Tc, a determination result is NO and the process moves to step S9.

In step S9, the output forbidding unit 23 forbids an output of an operation signal of the touch time Tx.

In step S5, when the touch time Tx is the successive touch threshold Tc or more, the determination result is YES and the process moves to step S6.

In step S6, the comparing unit 19 compares the touch time Tx with the long touch threshold T1. When the touch time Tx is less than the long touch threshold T1, the touch is determined as a successive touch, a determination result is NO, and the process moves to step S10.

In step S10, the output unit 21 generates a successive touch operation signal. In subsequent step S8, the output unit 21 outputs the successive touch operation signal to the air-conditioning device 9, and the process returns to START.

In step S6, when the touch time Tx is the long touch threshold T1 or more, the touch is determined as a long touch, a determination result is YES, and the process moves to step S7.

In step S7, the output unit 21 generates a long touch operation signal. In subsequent step S8, the output unit 21 outputs the long touch operation signal to the air-conditioning device 9, and the process returns to START.

Figure 5:
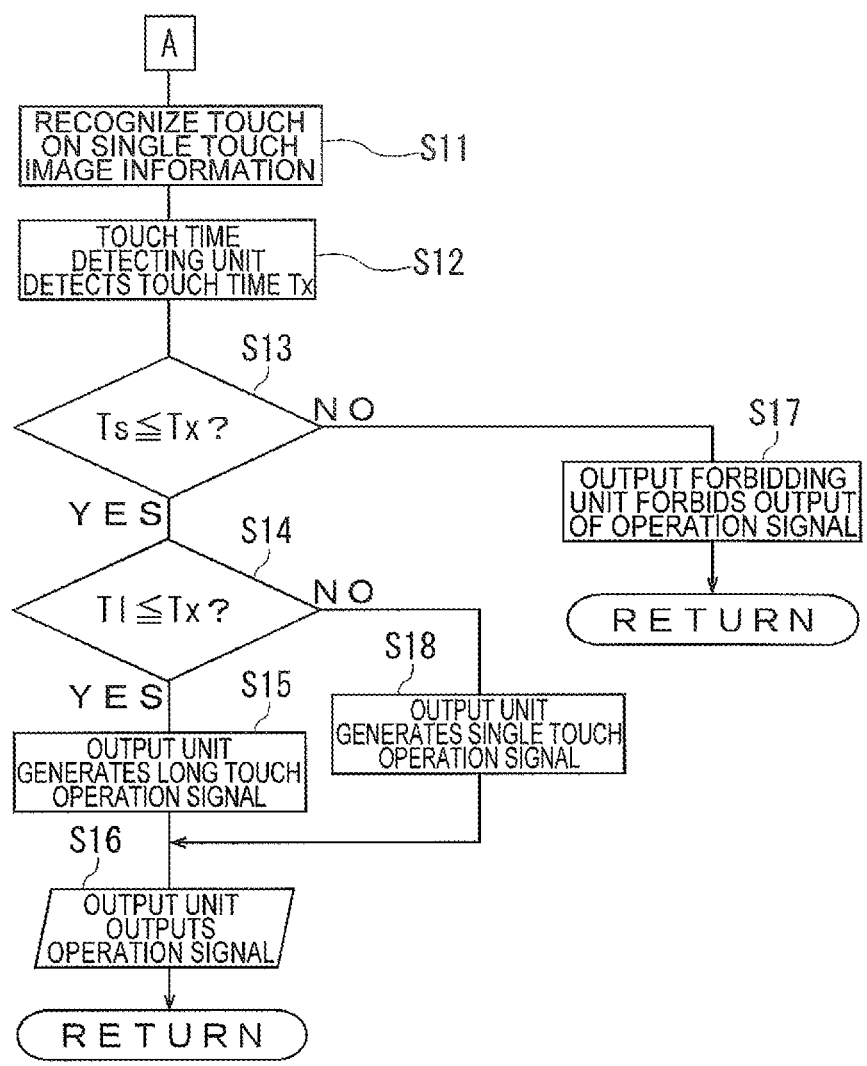
FIG. 5 is a flowchart illustrating that the panel of the touch switch module according to the embodiment is operated.

Meanwhile, in step S2, when the switches B to D, the switches G to I, the switch K and the switch L which are the single touch image information 3a are touched, the determination result is NO and the process moves to step S11 illustrated in FIG. 5. In step S11, the touch sensor 13 recognizes that the single touch image information 3a is touched.

In subsequent step S12, the touch time detecting unit 17 detects the touch time Tx in which the panel 2 is touched.

In subsequent step S13, the comparing unit 19 compares the touch time Tx with the single touch threshold Ts. When the touch time Tx is less than the single touch threshold Ts, a determination result is NO and the process moves to step S17.

In step S17, the output forbidding unit 23 forbids the output of the operation signal of the touch time Tx, and the process returns to START.

In step S13, when the touch time Tx is the single touch threshold Ts or more, a determination result is YES and the process moves to step S14.

In step S14, the comparing unit 19 compares the touch time Tx with the long touch threshold T1. When the touch time Tx is less than the long touch threshold T1, the touch is determined as a single touch, a determination result is NO and the process moves to step S18.

In step S18, the output unit 21 generates a single touch operation signal. In subsequent step S16, the output unit 21 outputs the single touch operation signal to the air-conditioning device 9, and the process returns to START.

In step S14, when the touch time Tx is the long touch threshold T1 or more, the touch is determined as a long touch, the determination result is YES, and the process moves to step S15.

In step S15, the output unit 21 generates a long touch operation signal. In subsequent step S16, the output unit 21 outputs the long touch operation signal to the air-conditioning device 9, and the process returns to START.

Thus, in this touch switch module 1 the output forbidding unit 23 of the ECU 15 forbids an output of an operation signal when the touch time Tx for which the successive touch image information 3b is touched is less than the successive touch threshold Tc. Further, when the touch time Tx for which the single touch image information 3a is touched is less than the single touch threshold Ts, the output forbidding unit 23 of the ECU 15 forbids the output of an operation signal. Consequently, when the user unintentionally touches the panel, by setting in advance the successive touch threshold Tc or the single touch threshold Ts corresponding to such time, an operation signal for operating the air-conditioning device 9 is not output from the ECU 15 in response to the touch, and the air-conditioning device 9 does not malfunction.

Further, this touch switch module 1 can distinguish each image information 3 based on, for example, the frequency of a user's touch, and distinguish an erroneous touch on the image information 3. Consequently, the user can more suitably operate the air-conditioning device 9.

Further, in this touch switch module 1, when the successive touch image information 3b is touched, the ECU 15 compares the touch time Tx with the successive touch threshold Tc and the long touch threshold T1 in order. Further, in this touch switch module 1, when the single touch image information 3a is touched, the ECU 15 compares the touch time Tx with the single touch threshold Ts and the long touch threshold T1 in order. Consequently, it is possible to match each threshold to the touch time Tx and the user can more easily perform an operation.

Further, in this touch switch module 1, the successive touch threshold Tc, the single touch threshold Ts and the long touch threshold T1 can be changed. When, for example, the user touches for a long time the predetermined image information 3 on the touch pad 2b, the touch switch module 1 is changed into a customize mode. Consequently, it is possible to customize each threshold according to a user's intention, and the user can more easily perform an operation.

Consequently, this touch switch module 1 can prevent the air-conditioning device 9 from malfunctioning due to an unintentional touch.

The present invention has been described, above with reference to the embodiment. The present invention is not limited to the above embodiment and can be adequately changed and applied in a range which does not deviate from the gist of the present invention.

One aspect of the present invention can be used for an air-conditioning device for a vehicle, an audio device, a navigation system, illumination equipment, a mobile phone and the like.

What is claimed is:

1. A touch switch module comprising:
    a panel which displays image information icons for instructing an operation of an air-conditioning device for a vehicle;
    a touch sensor which is formed in the panel, and which detects a touch on the image information icons; and
    a control unit which is connected to the touch sensor, and which outputs an operation signal for operating the air-conditioning device based on the touch, wherein
    the control unit includes a touch time detecting unit which detects a touch time period for which the panel is touched continuously, a comparing unit which compares the touch time period with a predetermined threshold, an output unit which outputs the operation signal when the touch time period is the threshold or more, and an output forbidding unit which forbids output of the operation signal when the touch time period is less than the threshold,
    the touch includes successive touches performed in succession, a single touch performed at one time and a long touch performed at one time, the successive touches being performed to adjust an environment in a vehicle interior,
    the image information icons include successive touch image information icons on which the successive touches are performed, single touch image information icons on which the single touch is performed, and long touch image information icons on which the long touch is performed,
    wherein the touch is maintained during the touch time period,
    wherein every one of the successive touch image information icons and the single touch image information icons is also one of the long touch image information icons,
    wherein the successive touch image information icons and the single touch image information icons are separate, and
    wherein all of the successive image information icons and the single touch image information icons are simultaneously displayed on the panel,
    the threshold includes a successive touch threshold to be compared with the touch time period of the successive touch image information icons, a single touch threshold to be compared with the touch time period of the single touch image information icons and a long touch threshold to be compared with the touch time period of the long touch image information icons,
    the successive touch threshold, the single touch threshold and the long touch threshold are different from one another, and
    the comparing unit is configured to:
        based upon one of the successive touch image information icons being touched, compare the touch time period with the successive touch threshold and then compare the touch time period to the long touch threshold, and
        based upon one of the single touch image information icons being touched, compare the touch time period with the single touch threshold and then compare the touch time period to the long touch threshold.

2. The touch switch module according to claim 1, wherein the successive touch threshold is smaller than the single touch threshold.

3. The touch switch module according to claim 1, wherein the successive touch threshold, the single touch threshold and the long touch threshold can be changed.

4. The touch switch module according to claim 1, wherein the threshold has a relationship of the successive touch threshold<the single touch threshold<the long touch threshold.

* * * * *